Feb. 17, 1931.  R. F. KOHR  1,793,231
BRAKE SHOE
Filed May 3, 1929

INVENTOR.
Robert F. Kohr
BY P. M. Pomeroy
ATTORNEY

Patented Feb. 17, 1931

1,793,231

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE SHOE

Original application filed May 10, 1928, Serial No. 276,636. Divided and this application filed May 3, 1929. Serial No. 360,124.

This invention relates to brakes for motor vehicles and particularly to brake shoes therefor, and is a division of my copending application Serial No. 276,636 filed May 10, 1928.

The principal object of my invention is to provide a brake element comprising a friction member having a rigid reinforcement for a greater portion of its length and a resilient end portion for the remainder of its length.

A further object is to provide a brake shoe adapted for use in a brake mechanism of the servo type which comprises two semi-circular members, two adjacent ends of which normally abut against the stop member and the other adjacent ends being provided with means to provide an adjustment for the brake element.

A still further object is to provide a brake shoe which is flexible at one end thereof and which has reinforcing means at the opposite end thereof to provide a rigid structure at that end of the shoe.

These being among the objects of the present invention, the same consists of certain features of construction and combination of parts to be hereinafter described with reference to the accompanying drawing, and then claimed, having the above and other objects in view.

In the accompanying drawing which illustrates a suitable embodiment of the present invention, Figure 1 is a section taken just inside the brake drum of a brake incorporated in the left front wheel of a motor vehicle, showing the brake element and brake operating mechanism therefor in elevation.

Figure 1:
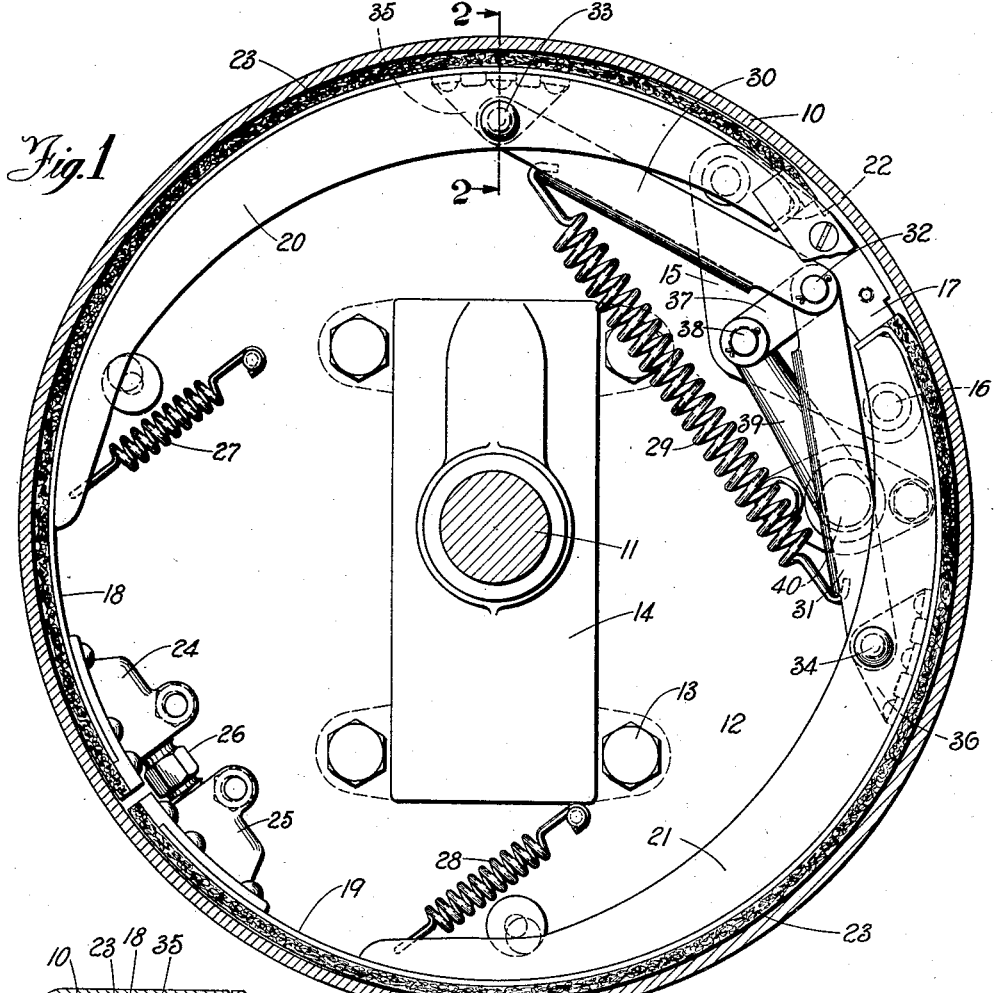
Figure 2:
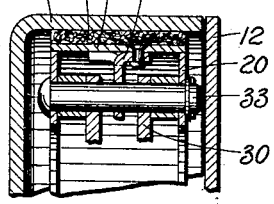
Figure 2 is a fragmentary sectional view taken on the line 2—2 of Figure 1 showing the brake shoe in transverse section.
Figure 3:
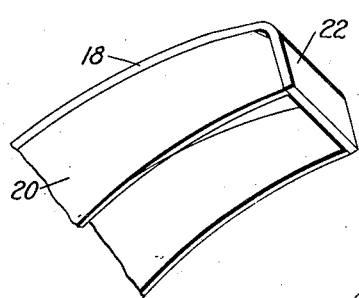
Figure 3 is a fragmentary perspective view showing the reinforced end of the brake shoe.

Referring to the accompanying drawing in which like numerals refer to like parts throughout the several views, the embodiment of this invention is shown for the purpose of illustration in connection with the front wheel brake mechanism of a motor vehicle and reference may be had to my copending application Serial No. 276,636 filed May 10, 1928 for details of construction not specifically described in this application. The brake drum 10 is secured in any suitable manner on a wheel hub, not shown, adapted to be rotatably mounted on the wheel spindle 11. A dust cover or backing plate 12 is secured by bolts 13 to the steering knuckle 14 in concentric relation with the drum 10 and as close as possible thereto to prevent dirt and foreign particles from getting into the brake mechanism and injuring the operating parts.

The mechanism for operating the brakes will be briefly described and comprises an L-shaped bracket 15 secured by rivets 16 to the backing plate 12 and has one leg thereof extending outwardly perpendicular to the backing plate 12 to provide a stop 17 for the ends of the brake element which is to be hereinafter described. The brake element comprises two semi-circular resilient bands 18 and 19, each of which is provided with a pair of spaced radial stiffening ribs 20 and 21 respectively. The ribs preferably vary in depth and extend for the greater part of the length of the band and are welded or otherwise secured thereto in any suitable manner. As the bands 18 and 19 and the reinforcements therefor are identical in construction only one of the same will be described in detail. The free end of each band preferably extends beyond the end of the ribs and is bent radially inwardly into abutting relationship with the ends of the ribs to provide an abutment face 22. The stiffening ribs 20 and 21 vary in depth and preferably are of greatest depth intermediate the ends thereof to provide a support for a part of the brake operating mechanism to be hereinafter described.

As before stated each of the friction members is preferably channel shaped and rigid for a greater part of their lengths, the same being rectangular and resilient for the remainder of their lengths. It is to be understood, however, that the strengthening ribs for the friction members may be formed if desired by flanging the sides of the brake bands radially inwardly or by securing channel shaped members thereto. The friction members 18 and 19 each have brake lining 23 secured to the outer face thereof which is adapted to be moved into contact with the brake drum to provide the vehicle retarding means.

Secured adjacent to the resilient ends of the members 18 and 19 are brackets 24 and 25 interconnected by a double ended screw 26 which provides means for adjusting the length of the brake element to provide an accurate adjustment of the same for increasing or decreasing the circumferential length thereof and to provide means for rigidly interconnecting the two friction members 18 and 19.

When the brake element is in normal inoperative position, the abutment faces 22 abut against opposite sides of the stop member 17, the same being held in that position and out of engagement with the brake drum 12 by means of the springs 27, 28 and 29, the spring 29 being connected at its opposite ends with the U-shaped links 30 and 31.

The brake element is preferably moved into engagement with the brake drum 10 by means of a toggle mechanism which comprises the links 30 and 31, the adjacent ends of which are pivoted together by means of a pin 32. The opposite ends 30 and 31 are pivoted by means of pins 33 and 34 to T-shaped brackets 35 and 36 secured in any suitable manner to the bands 18 and 19 and positioned between the ribs 20 and 21. A link 37 is pivoted at one end to the pin 32 and extends radially inwardly therefrom as shown in Figure 1. The free end of this link 37 is pivoted by means of a pin 38 to a lever 39 which is rigidly secured at one end to a rotatable shaft 40 extending through the backing plate 12. When the shaft 40 is rotated as by means of a foot pedal or brake lever (not shown) the arm 39 will be moved in an anticlockwise direction as viewed in Figure 1 whereupon the links 30 and 31 will be moved to expand the brake elements into engagement with the brake drum to retard or stop movement of the vehicle.

The reinforcing members 20 and 21 for the brake elements 18 and 19 are preferably of the smallest channel section adjacent to the brackets 24 and 25, the channels increasing in depth up to the pivot pins 33 and 34 to thereby provide rigidity and strength for the pivot pins which extend through the reinforcing flanges and brackets 35 or 36 to thereby provide a proper pivotal support for the U-shaped links 30 or 31. The depth of the channels may then be decreased toward the adjacent ends of the brake shoe and need be of only sufficient depth to receive the turned over end 22 to provide an abutment therefor.

While I have shown one embodiment of a brake shoe construction, it is to be understood, however, that certain changes may be made in the specific embodiment of the invention described without departing from the spirit and substance of the invention, the scope of which is commensurate with the appended claims.

What I claim is:

1. A brake element for a vehicle brake comprising a semi-circular friction member having an integral rigid reinforcement for a greater portion of its length and a resilient end portion for the remainder of its length.

2. A brake element for a vehicle brake comprising a pair of semi-circular friction members having rigid radial reinforcements for the greater portion of their lengths, and resilient portions for the remainder of their lengths, and means adjustably interconnecting said resilient portions.

3. A brake element for a vehicle brake comprising a pair of independent semi-circular friction members having rigid channel shaped portions for the greater part of their lengths, and resilient rectangular shaped portions for the remainder of their lengths, and means interconnecting said resilient portions.

4. A brake element for a vehicle brake comprising a pair of semi-circular resilient members, a pair of spaced radial reinforcements rigidly secured to each of said members for a greater part of its length to permit a resilient projecting end, and means interconnecting said resilient projecting ends.

5. A brake shoe comprising a resilient end portion and a channel shaped end portion, said channel portion being of greatest depth intermediate the ends thereof.

6. A brake shoe comprising a pair of resilient bands, radially extending members secured to a face of each band, said radial members being of greatest depth intermediate their ends, an abutment member formed integrally with each of said bands abutting against the ends of said radial members, and means adjustably interconnecting the opposite ends of said bands.

Signed by me at South Bend, Indiana, this 1st day of May, 1929.

ROBERT F. KOHR.